(12) United States Patent
Masuda et al.

(10) Patent No.: US 10,969,577 B2
(45) Date of Patent: Apr. 6, 2021

(54) OPTICAL SCANNING EQUIPMENT

(71) Applicant: Funai Electric Co., LTD., Osaka (JP)

(72) Inventors: Yuichiro Masuda, Takatsuki (JP); Tomohisa Hirai, Osaka (JP)

(73) Assignee: Funai Electric Co., LTD., Osaka (JP)

( * ) Notice: Subject to any disclaimer, the term of this patent is extended or adjusted under 35 U.S.C. 154(b) by 160 days.

(21) Appl. No.: 16/271,487

(22) Filed: Feb. 8, 2019

(65) Prior Publication Data

US 2019/0243127 A1 Aug. 8, 2019

(30) Foreign Application Priority Data

Feb. 8, 2018 (JP) .............................. JP2018-020777

(51) Int. Cl.
*G02B 26/10* (2006.01)
*G02B 26/12* (2006.01)
*G02B 26/08* (2006.01)

(52) U.S. Cl.
CPC ....... *G02B 26/105* (2013.01); *G02B 26/0816* (2013.01); *G02B 26/12* (2013.01)

(58) Field of Classification Search
CPC .. G02B 26/105; G02B 26/12; G02B 26/0816; G02B 5/005; G02B 5/00
See application file for complete search history.

(56) References Cited

U.S. PATENT DOCUMENTS

2009/0103156 A1 4/2009 Lim

FOREIGN PATENT DOCUMENTS

| CN | 103345061 A | * | 10/2013 |
|---|---|---|---|
| EP | 0620468 A1 | | 10/1994 |
| JP | 2010-266506 A | | 11/2010 |
| JP | 6184285 B2 | | 8/2017 |

OTHER PUBLICATIONS

Extended European Search Report issued in Application No. 19156271. 9, dated Jul. 22, 2019 (10 pages).
Office Action issued in Chinese Application No. 201910110293.1, dated Jul. 24, 2020 (6 pages).

* cited by examiner

*Primary Examiner* — Wen Huang
(74) *Attorney, Agent, or Firm* — Osha Bergman Watanabe & Burton LLP

(57) ABSTRACT

An optical scanning device includes a reflector that is pivotable, a light-emitter that emits a detection light toward the reflector, a detector that receives the detection light reflected at the reflector, and a light-blocking unit that includes a slit wherethrough the detection light passes. The light-blocking unit is disposed on an optical path whereby the detection light reflected from the reflector advances to the detector. The slit has an aspect ratio where a length of the slit in a direction in which the optical path extends relative to a length of the slit in a width direction is equal to or greater than a predetermined value. The width direction is along a pivoting direction of the reflector, of an opening end portion of the slit. The detector is configured to detect a pivot angle of the reflector by receiving the detection light that passes through the slit.

15 Claims, 13 Drawing Sheets

FIG. 8A
FIG. 8B
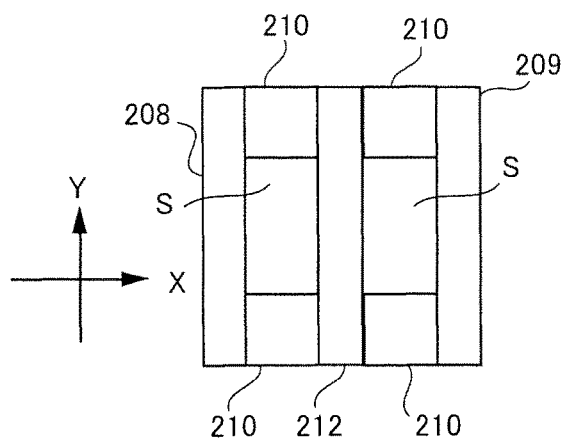
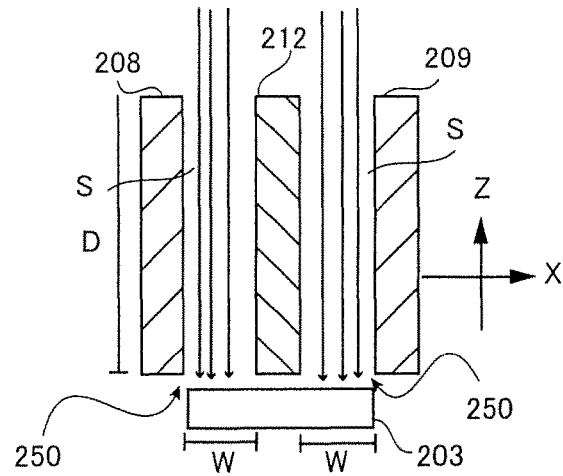

OPTICAL SCANNING EQUIPMENT

BACKGROUND

Technical Field

This invention relates to an optical scanning device and particularly to an optical scanning device configured to detect a pivot angle of a reflector.

Related Art

Conventional optical scanning devices detect a pivot angle of a reflector (for example, see patent literature 1).

Patent literature 1 discloses an optical scanning device including a mirror unit (reflecting member), a photoreflector (light-emitter and detector) that opposes a rear face of the mirror unit and uses the rear face of the mirror unit as a reflective face, and a reflected-light attenuation means provided with a slit. The optical scanning device is configured so light irradiated from the photoreflector is reflected by the rear face of the mirror unit; of the reflected light, light that passes through the slit is received by the photoreflector; and light other than this is blocked by the reflected-light attenuation means. By this, a pivot angle of the mirror unit is detected without using a face whereon scanning is performed.

Patent Literature 1: Japanese Patent Application Publication No. 2010-266506

However, with the optical scanning device described in patent literature 1, in a situation where a distance between the mirror unit and the photoreflector is decreased, a distance between the slit and the mirror unit also decreases; because of this, an angle range of light—of the light reflected from the mirror unit—that can pass through the slit increases. In this situation, there is a problem where light corresponding to a wide range of pivot angles becomes incident to the photoreflector, causing a lower resolution in pivot-angle detection.

SUMMARY

One or more embodiments of the present invention provide an optical scanning device that can have a high resolution in pivot-angle detection even in a situation where a distance between a reflector and a detector is short.

According to one or more embodiments of the present invention, by increasing an aspect ratio that is a length of a slit in a direction wherein an optical path extends relative to a length, in a width direction along a pivoting direction of a reflector, of an opening end portion of the slit, a resolution of pivot-angle detection can be increased even in a situation where a distance between the reflector and a detector is small.

An optical scanning device according to one or more embodiments of the present invention includes a pivotable reflector, a light-emitter that emits a detection light toward the reflector, a detector that receives the detection light, which is reflected at the reflector, and a light-blocking unit that includes a slit wherethrough the detection light passes, wherein the light-blocking unit is provided on an optical path whereby the detection light reflected from the reflector advances to the detector, the slit of the light-blocking unit has an aspect ratio where a length, in a direction wherein the optical path extends, of the slit relative to a length, in a width direction along a pivoting direction of the reflector, of an opening end portion of the slit is equal to or greater than a predetermined value, and the detector is configured to detect a pivot angle of the reflector by receiving the detection light that passes through the slit.

In the optical scanning device according to one or more embodiments of the invention, the slit of the light-blocking unit has the aspect ratio where the length, in the direction where the optical path extends, of the slit relative to the length, in the width direction along the pivoting direction of the reflector, of the opening end portion of the slit is equal to or greater than the predetermined value and the detector detects the pivot angle of the reflector by receiving the detection light that passes through the slit. By this, the detection light of a predetermined angle that is incident in a substantially perpendicular manner from the opening end portion of the slit can pass through the slit having the aspect ratio that is equal to or greater than the predetermined value. As such, it becomes incident to and is detected by the detector. Meanwhile, the detection light of an angle other than the predetermined angle becomes incident in a diagonal manner to the opening end portion of the slit having the aspect ratio that is equal to or greater than the predetermined value. As such, it is attenuated (absorbed) by a face forming the slit. As a result, the detection light of an angle other than the predetermined angle can be suppressed from becoming incident to the detector, and this enables a resolution of resolving the detection light of the predetermined angle and the detection light of an angle other than the predetermined angle to be increased. By this, an optical scanning device can be provided that can have a high resolution in pivot-angle detection even in a situation where a distance between the reflector and the detector is short.

In an optical scanning device according to one or more embodiments of the present invention, the aspect ratio of the slit of the light-blocking unit is equal to or greater than 20. Such a configuration can suppress the detection light that is incident in a diagonal manner to the slit from becoming incident to the detector. As a result, the detection light of an angle other than the predetermined angle can be suppressed from becoming incident to the detector, and this further improves the resolution of pivot-angle detection. For example, the detection light of an angle other than the predetermined angle may be suppressed from becoming incident to the detector in a situation where the aspect ratio of the slit of the light-blocking unit is equal to or greater than 20.

In an optical scanning device according to one or more embodiments of the present invention, the reflector includes a first reflective face that is used to scan light and a second reflective face that is provided on an opposite side of the first reflective face and used to detect the pivot angle and the detector is configured to detect the pivot angle of the first reflective face by receiving the detection light reflected at the second reflective face. Such a configuration synchronizes pivoting of the second reflective face to pivoting of the first reflective face. As such, by detecting the pivot angle of the second reflective face, the pivot angle of the first reflective face can be detected.

In an optical scanning device according to one or more embodiments of the present invention, the light-blocking unit includes a first support member, a second support member, and a slit member that configures the slit, and the slit member is interposed by the first support member and the second support member, the slit being formed by a portion surrounded by the first support member, the second support member, and the slit member. Such a configuration enables a user to forego drilling a hole to provide the slit in the light-blocking unit. As a result, the light-blocking unit provided with the slit can be readily made.

In one or more embodiments of the present invention, the first support member, the second support member, and the slit member are configured by plate-shaped members. Such a configuration enables the length, in the width direction along the pivoting direction of the reflector, of the opening end portion of the slit and the length, in the direction wherein the optical path extends, of the slit to be adjusted to any length. As a result, a slit having an aspect ratio equal to or greater than the predetermined value can be readily formed.

In one or more embodiments of the present invention, the slit of the light-blocking unit is rectangular when viewed from the direction wherein the optical path extends. With such a configuration, faces of the first support member, the second support member, and the slit member that form the slit are flat faces. As such, when the detection light that is diagonally incident to the slit strikes a face forming the slit, this detection light can be suppressed from being reflected at an angle different from the incidence angle. By this, in a situation where the detection light is incident to the slit in a very diagonal manner, the detection light can be suppressed from unintentionally becoming incident to the detector due to a change in the reflection angle.

In one or more embodiments of the present invention, the first support member and the second support member respectively include a first concave portion and a second concave portion recessed in a direction along the pivoting direction of the reflector and the first concave portion and the second concave portion are provided in portions other than the opening end portion, whereto the detection light is made incident and wherefrom the detection light is emitted. Such a configuration enables the detection light that is diagonally incident to the slit to be reflected at a deep position, on an inner face of the first concave portion or the second concave portion that is recessed in the direction along the pivoting direction of the reflector. As a result, a distance from an inner-wall diffusion point becomes long, sufficiently attenuating a light amount reaching the detector and suppressing this light amount to a level that can be ignored in sensing. Moreover, a sensing light with a large incidence angle is reflected at a position near the opening end portion wherefrom the sensing light is emitted. Moreover, the reflected detection light can be made to strike an inner bottom face of the first concave portion or second concave portion near the opening end portion and head in a direction that is different from the direction of heading toward the detector. Therefore, incidence to the detector can be suppressed, enabling further suppression of the detection light of the angle other than the predetermined angle becoming incident to the detector.

In one or more embodiments of the present invention, depths of the first concave portion and the second concave portion are of a size that is equal to or greater than the length in the width direction of the slit. Such a configuration enables the detection light that is diagonally incident to the slit to be reflected at a deep position, on an inner face of the first concave portion or the second concave portion that is recessed in the direction along the pivoting direction of the reflector. As such, a light amount reaching the detector can be suppressed even further. As a result, the detection light of the angle other than the predetermined angle can be suppressed even further from becoming incident to the detector.

In one or more embodiments of the present invention, in an optical scanning device configured from a first support member, a second support member, and a slit member configuring a slit, of the first support member and the second support member, at least a face opposing the slit member includes a light-absorbing material. Such a configuration causes the detection light that becomes diagonally incident to the slit and strikes a face forming the slit to be absorbed by the light-absorbing material. As a result, the detection light of the angle other than the predetermined angle that passes through the slit can be effectively decreased. By this, it is possible to detect only the detection light of the predetermined angle. As such, the resolution of the optical scanning device can be effectively increased.

In one or more embodiments of the present invention, in an optical scanning device configured from a first support member, a second support member, and a slit member configuring a slit, a plurality of slit members is stacked in a direction of being interposed by the first support member and the second support member and partitioning members are provided between slit member and slit member. Such a configuration enables an amount of the detected light that passes through to be increased without changing the length, in the width direction along the pivoting direction of the reflector, of the opening end portion of the slit and the length, in the direction wherein the optical path extends, of the slit. As a result, a maximum received-light intensity can be improved while maintaining the aspect ratio that is equal to or greater than the predetermined value.

In one or more embodiments of the present invention, the reflector performs reciprocating pivoting movement and the detector is configured to acquire the pivot angle based on a time from when the detection light reflected by the reflector is received to when the detection light reflected by the reflector is again received. Such a configuration enables an accurate maximum pivot angle to be acquired based on a time of reciprocating pivoting movement.

In one or more embodiments of the present invention, in an optical scanning device configured from a first reflective face and a second reflective face, an area of the second reflective face is smaller than an area of the first reflective face. Such a configuration enables a range of the detected light reflected at the second reflective face to be decreased. This enables suppressing the sensing light that does not enter the slit from becoming leaked light by being irradiated to a portion outside a range of the light-blocking unit.

In one or more embodiments of the present invention, a rear face of the first reflective face, except for the second reflective face, is applied with a light-reflection suppression treatment. Such a configuration enables suppression of the detection light that strikes a portion other than the second reflective face from being reflected. As such, the detection light reflected by the second reflective face can be reliably suppressed from leaking to a face whereon light scanning is performed (first reflective face).

In one or more embodiments of the present invention, a plurality of light-blocking units and a plurality of detectors are provided and the pivot angle is configured to be acquired from the detection lights acquired by each of the plurality of detectors. Such a configuration enables the pivot angle to be acquired relatively based on the detection lights acquired by each of the plurality of detectors.

One or more embodiments of the present invention provide an optical scanning device that can have a high resolution in pivot-angle detection even in a situation where a distance between a reflector and a detector is short.

BRIEF DESCRIPTION OF DRAWINGS

FIG. 8A is a front view of the light-blocking unit when viewed from the direction wherein the optical path extends according to the second embodiment of the present invention.

FIG. 8B is a cross-sectional view where the light-blocking unit is cut at a plane orthogonal to a pivoting direction of a reflector according to the second embodiment of the present invention.

DETAILED DESCRIPTION

Embodiments of the present invention will be described in detail below with reference to the drawings. In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

First, a configuration of an optical scanning device 100 of a first embodiment of the present invention is described with reference to FIGS. 1 to 7. In one or more embodiments of the present invention, a pivoting direction of a reflector 101 is defined as an Ry direction; a width direction, along the pivoting direction of the reflector 101, of an opening end portion 150 of a slit s is defined as an X-axis direction; a direction wherein the slit s extends is defined as a Z-axis direction; and a direction perpendicularly intersecting the X-axis direction and the Z-axis direction is defined as a Y-axis direction.

(Configuration of Optical Scanning Device)

Figure 1:
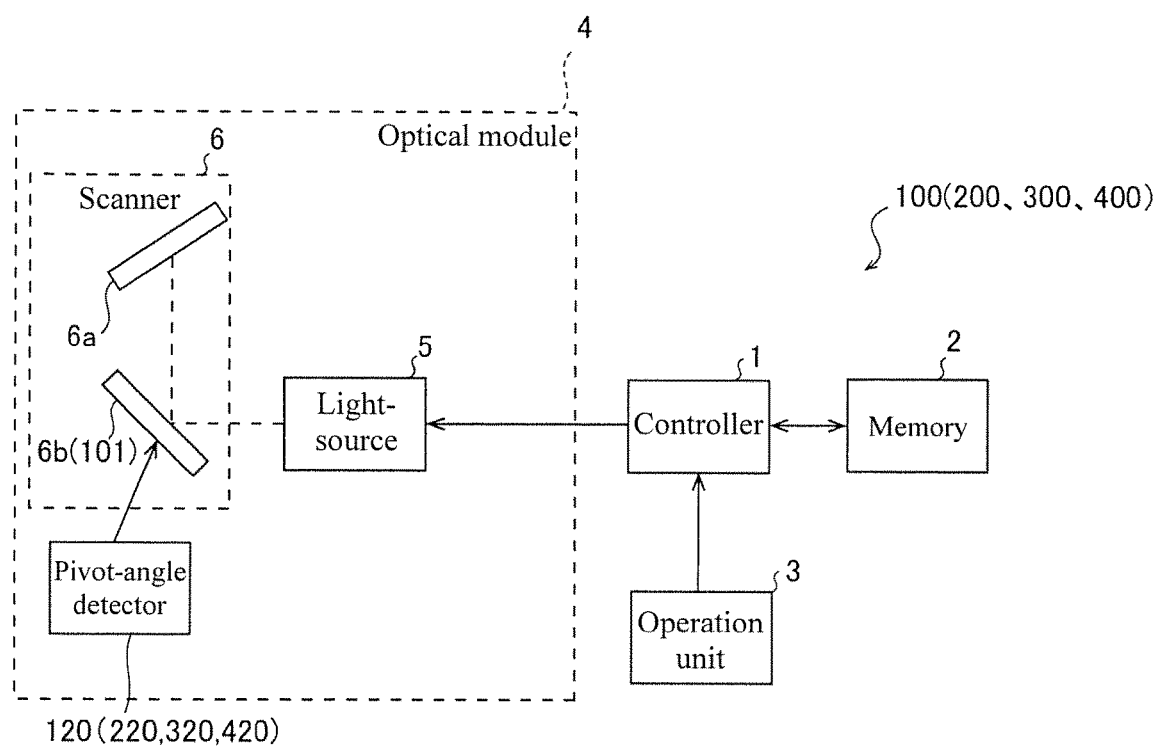
FIG. 1 is a schematic diagram illustrating a configuration of optical scanning devices according to one or more embodiments of the present invention.

As illustrated in FIG. 1, the scanning optical device 100 of the first embodiment of the present invention includes a controller 1, a memory 2, an operation unit 3, and an optical module 4. The controller 1 is configured to control an entirety of the optical scanning device 100. The memory 2 stores, for example, a program for controlling pivot angles of a vertical scanning mirror 6a and a horizontal scanning mirror 6b, which are described below. The controller 1 starts control of the optical scanning device 100 by an operator performing an input operation by the operation unit 3.

The optical module 4 includes a light-source 5 and a scanning unit 6. The light-source 5 irradiates lights of various wavelengths to the scanner 6. The scanner 6 has the vertical scanning mirror 6a and the horizontal scanning mirror 6b, which are for reflecting the light irradiated from the light-source 5. The vertical scanning mirror 6a is held in a holding unit (not illustrated) and is formed in a rectangular and flat shape. Moreover, the vertical scanning mirror 6a is configured to be swung and driven around a swinging axis. Note that a natural frequency of the vertical scanning mirror 6a is determined according to a material and a structure thereof. Moreover, the horizontal scanning mirror 6b is configured to resonate. The horizontal scanning mirror 6b is configured to have the pivot angle thereof detected by a pivot-angle detector 120, which is described below. The light irradiated from the light-source 5 is reflected by the scanner 6 and irradiated from the optical scanning device 100 to the outside.

(Pivot-Angle Detection Unit)

Figure 3:
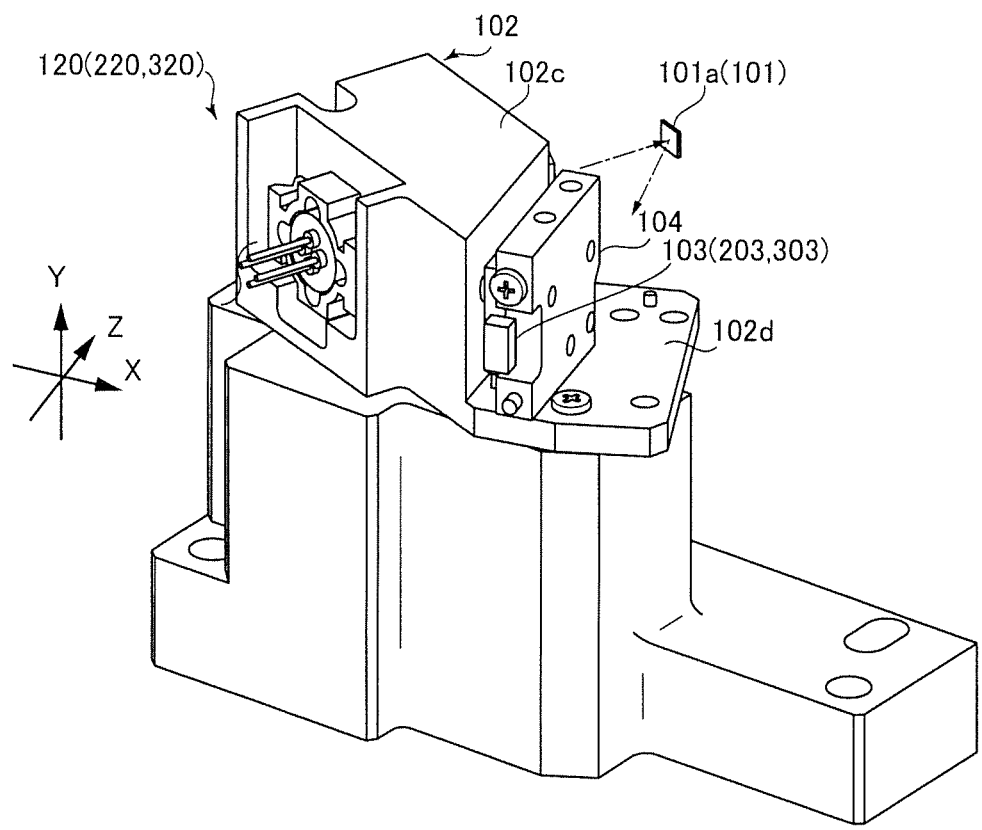
FIG. 3 is a perspective view illustrating the configuration of the pivot-angle detectors according to first to third embodiments of the present invention.

As illustrated in FIG. 3, the pivot-angle detector 120 of the optical scanning device 100 of the first embodiment of the present invention includes the reflector 101, a light-emitter 102, a detector 103, and a light-blocking unit 104.

Figure 4:
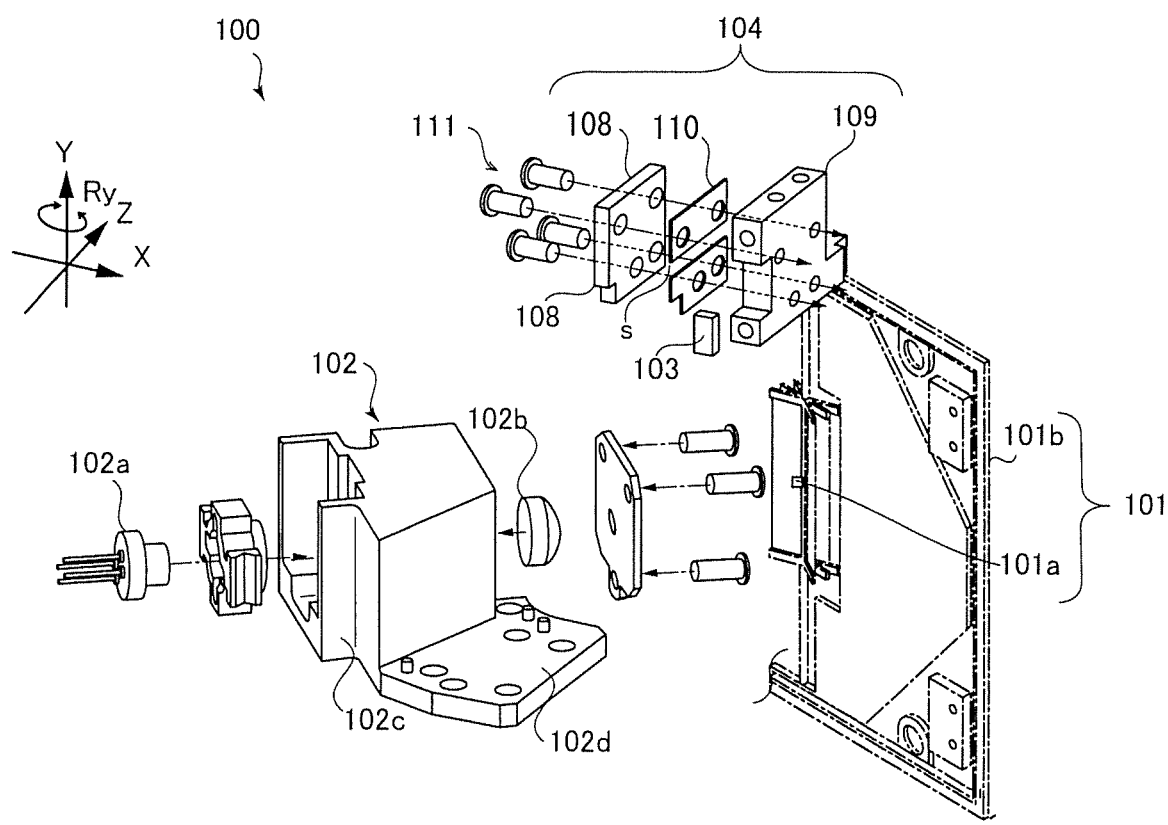
FIG. 4 is an exploded perspective view illustrating the configuration of the pivot-angle detector of the first embodiment of the present invention.

As illustrated in FIGS. 3 and 4, the reflector 101 is configured from a reflecting member 101a that reflects a detection light emitted from the light-emitter 102 and a holding member 101b that supports the reflecting member 101a. A shape of the holding member 101b is not limited in particular. The reflecting member 101a is configured to perform reciprocating pivoting movement in the Ry direction. An angle whereby the reflector 101 pivots from a resting position is defined as a pivot angle θ.

Figure 5A:
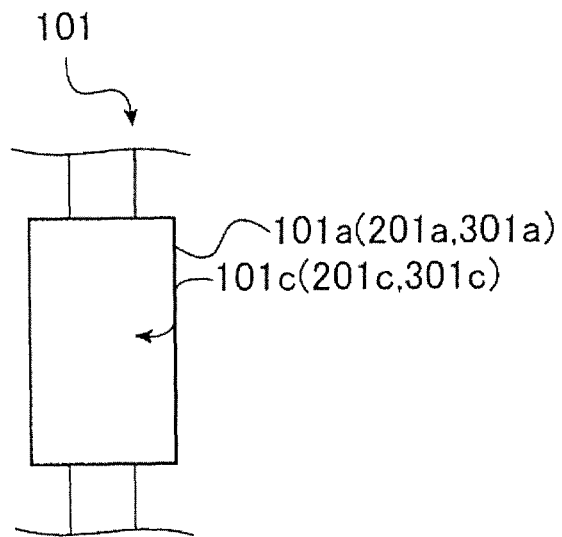
FIG. 5A is a diagram illustrating first reflective faces according to one or more embodiments of the present invention.
Figure 5B:
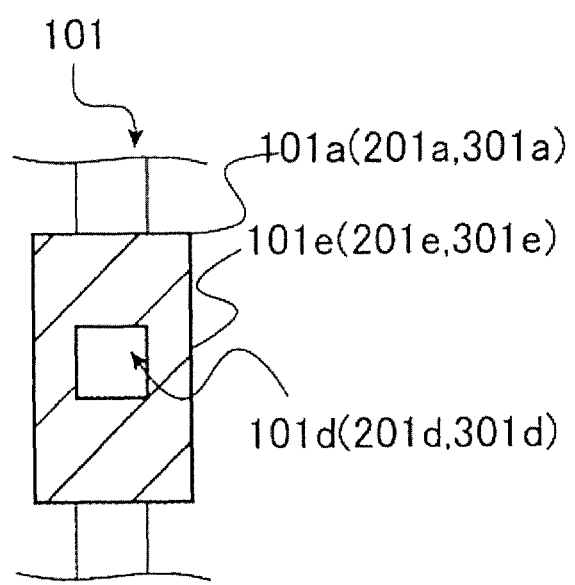
FIG. 5B is a diagram illustrating second reflective faces according to one or more embodiments of the present invention.

The reflector 101 of the first embodiment of the present invention includes, as illustrated in FIG. 5A, a first reflective face 101c that is used to scan a scanning light and, as illustrated in FIG. 5B, a second reflective face 101d that is provided on an opposite side of the first reflective face 101c and is used to detect the pivot angle θ. Moreover, in the reflector 101, the first reflective face 101c and the second reflective face 101d are front and rear faces of the same body. Because of this, the second reflective face 101d is configured to pivot in conjunction with pivoting of the first reflective face 101c. The first reflective face 101c is the horizontal scanning mirror 6b (see FIG. 1).

In the reflector 101, the second reflective face 101d is installed on a rear face 101e of the first reflective face 101c. An area of the second reflective face 101d of the reflector 101 is smaller than an area of the first reflective face 101c. Except for the second reflective face 101d, the rear face 101e of the first reflective face 101c is applied with a light-reflection suppression treatment and made into a reflection-suppressing face (the hatched portion in FIG. 5B). The light-reflection suppression treatment is performed by, for example, affixing a black nonwoven fabric on the rear face 101e except for the second reflective face 101d.

Figure 6A:
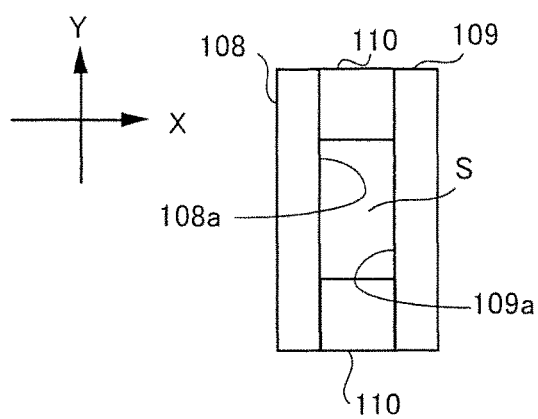
FIG. 6A is a front view of a light-blocking unit when viewed from a direction where an optical path extends according to the first embodiment of the present invention.
Figure 6B:
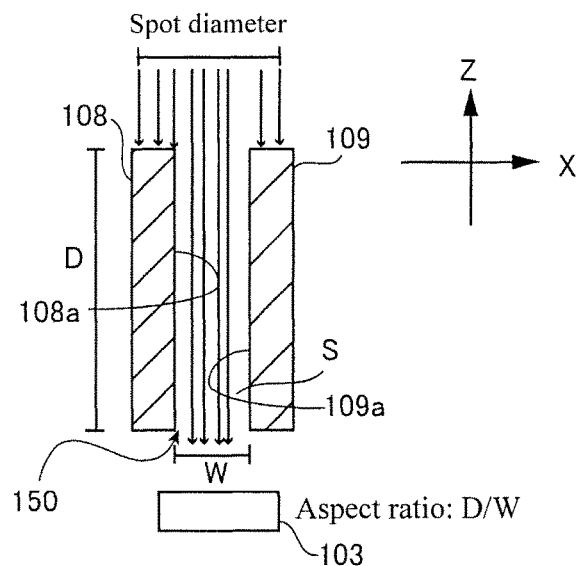
FIG. 6B is a cross-sectional view where the light-blocking unit is cut at a plane orthogonal to a pivoting direction of a reflector according to the first embodiment of the present invention.

The light-emitter 102 includes a semiconductor laser element that irradiates a laser light as the detection light. The light-emitter 102 and light sources that irradiate detection lights to the first reflective face 101c are provided separately. The light-emitter 102 includes a laser diode 102a and an output lens 102b; a laser output from the laser diode 102a is irradiated to the reflector 101 via the output lens 102b. As illustrated in FIG. 6B, a spot diameter of the detection light of the light-emitter 102 is formed to be greater than a slit diameter W of the slit s, which is described below. The light-emitter 102 further includes a support base 102c that supports the laser diode 102a and the output lens 102b.

Figure 6C:
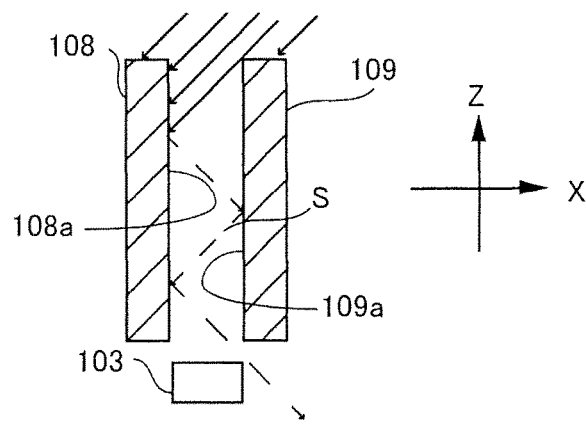
FIG. 6C is a cross-sectional view where the light-blocking unit is cut at a plane orthogonal to the pivoting direction of the reflector according to the first embodiment of the present invention.

The detector 103 is, for example, a photodiode. As illustrated in FIGS. 6A-6C, the detector 103 is configured to detect the pivot angle θ of the reflector 101 by receiving the detection light, which is reflected at the second reflective face 101d and passes through the slit s. The detector 103 is connected to a controller (CPU) 105 (see FIG. 2) that includes an MCU (memory control unit). The controller 105 is configured to acquire the pivot angle θ, which is stored in the memory 2, based on a time from when the detector 103 receives the detection light reflected at the second reflective face 101d of the reflector 101 to when the detector 103 again receives the detection light reflected at the second reflective face 101d of the reflector 101 due to the reflector 101 engaging in reciprocating pivoting movement. At this time, the controller 105 is configured to acquire the pivot angle θ from the measured time and a relationship between time and pivot angle that is acquired in advance and stored in the memory 2.

Figure 2:
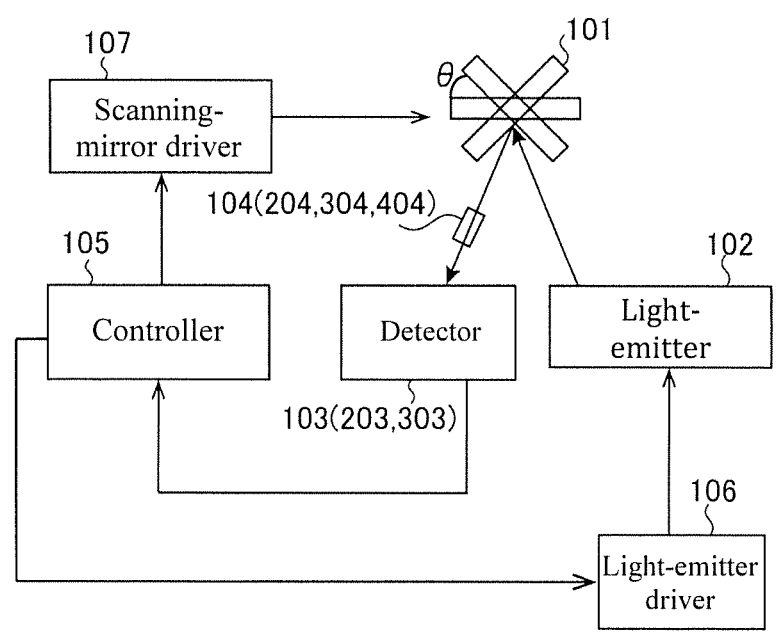
FIG. 2 is a block diagram illustrating a configuration of pivot-angle detectors of the according to one or more embodiments of the present invention.

As illustrated in FIGS. 2 and 6A-6B, the light-blocking unit 104 is provided on an optical path whereby the detection light reflected from the reflector 101 advances to the detector 103. Moreover, the light-blocking unit 104 includes the slit s wherethrough the detection light passes. The slit s extends so as to be substantially parallel to an optical path of the optical path whereby the detection light reflected from the reflector 101 advances to the detector 103 of a detection light that is reflected from the reflector 101 when the reflector 101 is at a predetermined pivot angle θ. The slit s has an aspect ratio where a length D thereof in a direction wherein the optical path extends (Z-axis direction) relative to a length (slit diameter) W, in the width direction (X-axis direction) along the pivoting direction (Ry direction) of the reflector 101, of the opening end portion 150 of the slit s is equal to or greater than a predetermined value. A material of the light-blocking unit 104 is not limited in particular. The aspect ratio refers to a value where the length D in the Z-axis direction is divided by the length W in the X-axis direction. The slit s of the light-blocking unit 104 of the pivot-angle detector 120 has a predetermined aspect ratio. A situation where the aspect ratio is equal to or greater than 10 is referred to as the aspect ratio that is equal to or greater than the predetermined value. The aspect ratio of the slit s of the light-blocking unit 104 of the pivot-angle detector 120 of the first embodiment of the present invention is equal to or greater than 20. According to one or more embodiments of the present invention, the aspect ratio of the slit s of the light-blocking unit 104 is equal to or greater than 50. For example, the aspect ratio of the slit s of the light-blocking unit 104 may be equal to or greater than 100.

Furthermore, in the first embodiment of the present invention, as illustrated in FIGS. 4 and 6A-6B, the light-blocking unit 104 is configured from a first support member 108, a second support member 109, and a slit member 110 that configures the slit s. The slit member 110 is interposed by the first support member 108 and the second support member 109. Moreover, the slit member 110 is configured from two members that respectively configure an upper face and a lower face of the slit s. Note that the first support member 108, the second support member 109, and the slit member 110 are fixed to each other by a fastening member 111. The slit s is formed by a portion surrounded by the first support member 108, the second support member 109, and the slit member 110. The first support member 108, the second support member 109, and the slit member 110 are formed using metal or resin. A slit s with a high aspect ratio is formed by making a length in the Z-axis direction formed by the first support member 108, the second support member 109, and the slit member 110 long and making a length in the X-axis direction formed thereby short.

Of the first support member 108 and the second support member 109, at least faces opposing the slit member 110 include light-absorbing materials (108a, 109a). For example, in a situation where the first support member 108 or the second support member 109 is resin, a black nonwoven fabric is affixed as the light-absorbing material (108a, 109a). Moreover, in a situation where the first support member 108 or the second support member 109 is metal, a treatment is performed of forming an oxide film as the light-absorbing material (108a, 109a).

As illustrated in FIG. 6B, in a situation where an incidence angle of the detection light that is reflected upon striking the second reflective face 101d of the reflector 101 is substantially a predetermined angle, the detection light is incident in a substantially perpendicular manner such that it can pass through the slit s. However, in a situation where the incidence angle to the slit s is other than the predetermined angle, the detection light is incident to the slit s in a diagonal manner such that it strikes a face forming the slit s and is absorbed. Alternatively, even if the detection light is emitted from the slit s upon being reflected, by striking an inner wall, it becomes diffused, becoming sufficiently attenuated. As such, a light amount reaching the detector 103 is at a level that can be ignored in angle sensing. As a result, because the detection light is detected by the detector 103 only in the situation where the incidence angle thereof to the slit s is substantially the predetermined angle, a pivot angle θ of the reflector 101 corresponding to the incidence angle that is the predetermined angle to the slit s is detected in a state where a received-light intensity is high whereas a pivot angle θ of the reflector 101 corresponding to an incidence angle that is other than the predetermined angle to the slit s is detected in a state where the received-light intensity is low. Therefore, a resolution of the pivot angle θ of the reflector 101 can be increased.

As illustrated in FIG. 3, the light-blocking unit 104 is fixed on a fixing portion 102d provided to the support base 102c of the light-emitter 102. Moreover, the detector 103 is installed on a face on an opposite side of the reflector 101 of the light-blocking unit 104. Moreover, an angle in the Ry direction when disposing the light-blocking unit 104 on the fixing portion 102d is determined freely by a user by, for example, aligning the light-blocking unit 104 to a pivot angle that is wanting to be detected.

A method of the pivot-angle detector 120 of the first embodiment of the present invention acquiring the pivot angle θ is described with reference to FIG. 2. First, by the controller 105 controlling the light-emitter 102, the detection light is irradiated to the reflector 101. The detection light is reflected at the second reflective face 101d of the reflector 101 and becomes incident to the light-blocking unit 104. The detection light that passes through the slit s of the light-blocking unit 104 becomes incident to the detector 103 and is detected. The controller 105 detects the pivot angle θ from the detected detection light. Based on the acquired pivot angle θ, the controller 105 controls a scanning-mirror driver 107 and controls the pivot angle and the like.

Figure 7:
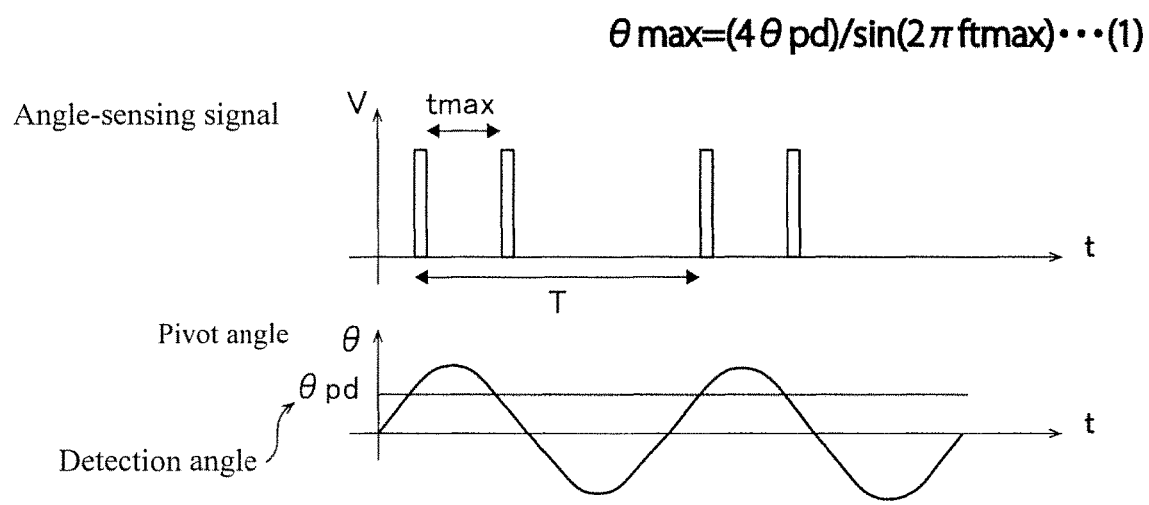
FIG. 7 is a diagram for describing seeking a maximum pivot angle from a detected pivot angle according to one or more embodiments of the present invention.

A detection method of a maximum pivot angle θmax of the first embodiment of the present invention is detailed based on FIG. 7. When the reflector 101 of the first embodiment of the present invention is scanning the scanning light, the detection light is irradiated from the light-emitter 102 to detect the pivot angle θ of the reflector 101. The reflector 101 is engaged in pivoting reciprocal movement; in FIG. 7, T is a time of one pivot and tmax is the time from when the detection light is received the first time to when the detection light is received the second time. f represents a frequency of the reflector 101 engaged in reciprocating pivoting movement, and θpd indicates a detection angle of the reflector 101 (the pivot angle θ of the reflector 101 corresponding to the incidence angle that is the predetermined angle to the slit s). The maximum pivot angle θmax is calculated by the formula in FIG. 7.

The controller 105 then feeds back the calculated maximum pivot angle θmax to the scanning-mirror driver 107 to adjust the pivot angle and the like.

The first embodiment of the present invention may provide advantages such as the following.

As above, in the optical scanning device 100 of the first embodiment, the slit s of the light-blocking unit 104 has the aspect ratio where the length (D), in the direction wherein the optical path extends, of the slit s relative to the length (W), in the width direction along the pivoting direction of the reflector 101, of the opening end portion 150 of the slit s is equal to or greater than the predetermined value and the detector 103 detects the pivot angle θ of the reflector 101 by receiving the detection light that passes through the slit s. By this, the detection light of the predetermined angle that is incident in the substantially perpendicular manner from the opening end portion 150 of the slit s can pass through the slit s having the aspect ratio that is equal to or greater than the predetermined value. As such, it becomes incident to and is detected by the detector 103. Meanwhile, the detection light of an angle other than the predetermined angle becomes incident in a diagonal manner to the opening end portion 150 of the slit s having the aspect ratio that is equal to or greater than the predetermined value. As such, it is attenuated (absorbed) by a face forming the slit s. As a result, the detection light of an angle other than the predetermined angle can be suppressed from becoming incident to the detector 103, and this enables a resolution of resolving the detection light of the predetermined angle and the detection light of an angle other than the predetermined angle to be increased. By this, an optical scanning device 100 can be provided that can have a high resolution in pivot-angle detection even in a situation where a distance between the reflector 101 and the detector 103 is short.

Furthermore, in the first embodiment of the present invention, the aspect ratio of the slit s of the light-blocking unit 104 is equal to or greater than 20. This can suppress the detection light that is incident in a diagonal manner to the slit s from becoming incident to the detector 103. As a result, the detection light of an angle other than the predetermined angle can be suppressed from becoming incident to the detector 103, and this can further improve the resolution of pivot-angle detection.

Furthermore, in the first embodiment of the present invention, the reflector 101 is configured from the first reflective face 101c that is used to scan light and the second reflective face 101d that is provided on the opposite side of the first reflective face 101c and used to detect the pivot angle θ and the detector 103 is configured to detect the pivot angle θ of the first reflective face 101c by receiving the detection light reflected at the second reflective face 101d. This synchronizes pivoting of the second reflective face 101d to pivoting of the first reflective face 101c. As such, by detecting the pivot angle θ of the second reflective face 101d, the pivot angle θ of the first reflective face 101c can be detected.

Furthermore, in the first embodiment of the present invention, the light-blocking unit 104 is made of the first support member 108, the second support member 109, and the slit member 110 that configures the slit s; the slit member 110 is interposed by the first support member 108 and the second support member 109; and the slit s is formed by the portion surrounded by the first support member 108, the second support member 109, and the slit member 110. This enables the user to forego drilling a hole to provide the slit s in the light-blocking unit 104. As a result, the light-blocking unit 104 provided with the slit s can be readily made.

Furthermore, in the first embodiment of the present invention, the first support member 108, the second support member 109, and the slit member 110 are configured by plate-shaped members. This enables the length, in the width direction (X-axis direction) along the pivoting direction of the reflector 101, of the opening end portion 150 and the length in the direction (Z-axis direction) wherein the optical path extends to be readily adjusted to any length. As a result, a slit s having an aspect ratio equal to or greater than the predetermined value can be readily formed, enabling the optical scanning device 100 to have a high resolution of detecting the pivot angle θ.

Furthermore, in the first embodiment of the present invention, the slit s of the light-blocking unit 104 is formed to be rectangular when viewed from the direction wherein the optical path extends. By this, the faces of the first support member 108, the second support member 109, and the slit member 110 that form the slit s are flat faces. As such, when the detection light that is diagonally incident to the slit s strikes a face forming the slit s, this detection light can be suppressed from being reflected at an angle different from the incidence angle. By this, in a situation where the detection light is incident to the slit s in a very diagonal manner, the detection light can be suppressed from unintentionally becoming incident to the detector 103 due to a change in the reflection angle.

Furthermore, in the first embodiment of the present invention, of the first support member 108 and the second support member 109, at least the faces opposing the slit member 110 are respectively provided with the light-absorbing materials 108a, 109b. This causes the detection light that becomes diagonally incident to the slit s and strikes a face forming the slit s to be absorbed by the light-absorbing material 108a or 109*b*. As a result, the detection light of the angle other than the predetermined angle that passes through the slit s can be effectively decreased. By this, it is possible to detect only the detection light of the predetermined angle. As such, the resolution of the optical scanning device 100 can be effectively increased.

Furthermore, in the first embodiment of the present invention, the reflector 101 performs reciprocating pivoting movement and the detector 103 is configured to acquire the pivot angle θ based on the time from when the detection light reflected by the reflector 101 is received to when the detection light reflected by the reflector 101 is again received. Such a configuration enables an accurate pivot angle θ to be acquired based on the time of reciprocating pivoting movement.

Furthermore, in the first embodiment of the present invention, the area of the second reflective face 101*d* is configured to be smaller than the area of the first reflective face 101*c*. This enables a range of the detected light reflected at the second reflective face 101*d* to be decreased. This enables suppressing a sensing light that does not enter the slit s from becoming leaked light by being irradiated to a portion outside a range of the light-blocking unit 104.

Furthermore, in the first embodiment of the present invention, the rear face 101*e* of the first reflective face 101*c*, except for the second reflective face 101*d*, is applied with the light-reflection suppression treatment. Such a configuration enables suppression of the detection light that strikes a portion other than the second reflective face 101*d* from being reflected. As a result, the detection light reflected by the second reflective face 101*d* can be reliably suppressed from leaking to a face whereon light scanning is performed (first reflective face 101*c*).

Second Embodiment

A configuration of a pivot-angle detector 220 of a second embodiment of the present invention is described with reference to FIGS. 1 to 3 and 8A-8B. Unlike the pivot-angle detector 120 of the first embodiment, the pivot-angle detector 220 of the second embodiment of the present invention stacks a plurality of slit members 210. Note that in a configuration of an optical scanning device 200 (see FIGS. 1 to 3), portions identical to the first embodiment of the present invention are labeled with the same reference signs, description thereof being omitted.

In the pivot-angle detector 220 of the second embodiment of the present invention, as illustrated in FIGS. 8A-8B, the plurality of slit members 210 is stacked in a direction of being interposed by a first support member 208 and a second support member 209 and partitioning members 212 are provided between slit member 210 and slit member 210. As illustrated in FIGS. 8A-8B, by the detection light passing through a plurality of slits s, an amount of the detected light that becomes incident to a detector 203 increases. Like the first support member 208, the second support member 209, and the slit member 210, the partitioning member 212 is manufactured of resin, metal, or the like. Moreover, the partitioning member 212 may be applied with a reflection suppression treatment. One detector 203 may be provided, or, in accordance with the slit members 210, a plurality of detectors 203 may be provided. Note that other configurations of the second embodiment of the present invention are similar to the first embodiment of the present invention.

The second embodiment of the present invention may provide advantages such as the following.

In the optical scanning device 200 of the second embodiment, the plurality of slit members 210 is stacked in the direction of being interposed by the first support member 208 and the second support member 209 and the partitioning members 212 are provided between slit member 210 and slit member 210. This enables the amount of the detected light that passes through to be increased without changing the length, in the width direction (X-axis direction) along a pivoting direction of a reflector 201, of an opening end portion 250 and the length in the direction (Z-axis direction) wherein the optical path extends. As a result, the received-light intensity can be improved while maintaining the aspect ratio that is equal to or greater than the predetermined value. Note that other effects of the second embodiment of the present invention are similar to the first embodiment of the present invention.

Third Embodiment

A configuration of a pivot-angle detector 320 of a third embodiment of the present invention is described with reference to FIGS. 1 to 3 and 9. Unlike the pivot-angle detector 120 of the first embodiment, the pivot-angle detector 320 of the third embodiment of the present invention has a first concave portion 313 and a second concave portion 314 respectively provided in a first support member 308 and a second support member 309 of a light-blocking unit 304. Note that in a configuration of an optical scanning device 300 (see FIGS. 1 to 3), portions identical to the first embodiment of the present invention are labeled with the same reference signs, description thereof being omitted.

The first support member 308 and the second support member 309 respectively include the first concave portion 313 and the second concave portion 314, which are recessed in a direction along a pivoting direction of a reflector 301. The first concave portion 313 and the second concave portion 314 are provided in portions other than an opening end portion 350 whereto the detection light becomes incident and wherefrom the detection light is emitted. By such a configuration, a position whereat the detection light that is diagonally incident to the slit s is reflected becomes close to the opening end portion 350, where the detection light is emitted from the slit s. Moreover, the detection light that becomes diagonally incident to the slit s is sufficiently attenuated by striking the inner wall and the light amount reaching the detector 103 is at a level that can be ignored in angle sensing.

Figure 9:
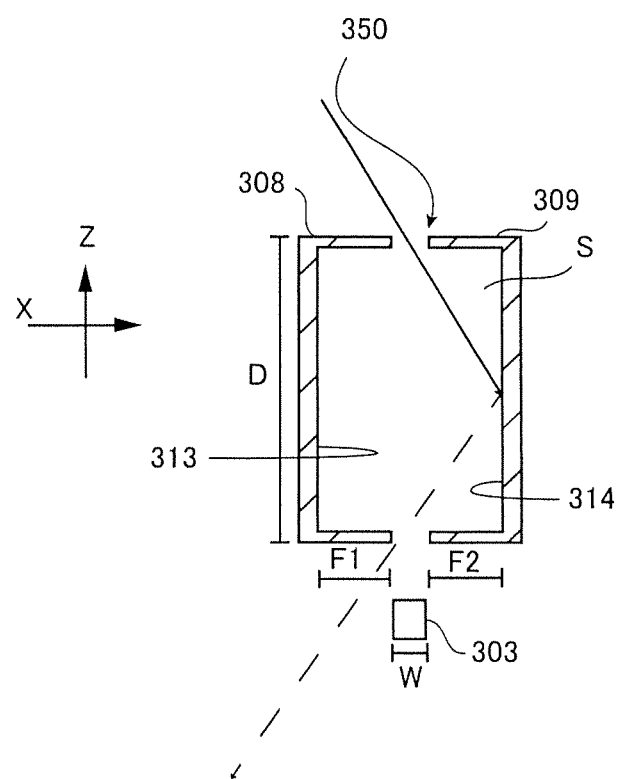
FIG. 9 is a cross-sectional view where a light-blocking unit is cut in a width direction along a pivoting direction of a reflector according to the third embodiment of the present invention.

As illustrated in FIG. 9, a depth (length) F1 from a face of the first support member 308 forming the opening end portion 350 to an inner face of the first concave portion 313 and a depth (length) F2 from a face of the second support member 309 forming the opening end portion 350 to an inner face of the second concave portion 314 are formed at sizes that are equal to or greater than the length W, in the width direction (X-axis direction) along the pivoting direction of the reflector 301, of the opening end portion 350. The deeper the depths of the first concave portion 313 and the second concave portion 314, a position whereat the detection light strikes and reflects from a face forming the slit s becoming closer to the opening end portion 350 wherefrom the detection light is emitted from the slit s. In the third embodiment of the present invention, a shape of the first concave portion 313 and the second concave portion 314 is U-shaped in a cross section orthogonal to the direction wherein the optical path extends (Z-axis direction). Note that other configurations of the third embodiment of the present invention are similar to the first embodiment of the present invention.

The third embodiment of the present invention may provide advantages such as the following.

In the optical scanning device 300 of the third embodiment of the present invention, the first support member 308 and the second support member 309 respectively include the first concave portion 313 and the second concave portion 314 that are recessed in the direction (X-axis direction) along the pivoting direction of the reflector 301 and the first concave portion 313 and the second concave portion 314 are provided in portions other than the opening end portion 350, whereto the detection light is made incident and wherefrom the detection light is emitted. This enables the detection light that is diagonally incident to the slit s to be reflected at a deep position, on the inner face of the first concave portion 313 or the second concave portion 314 that is recessed in the direction along the pivoting direction Ry of the reflector 301. As a result, a distance from an inner-wall diffusion point becomes long, sufficiently attenuating the light amount reaching the detector 303 and suppressing this light amount to a level that can be ignored in sensing. Moreover, a sensing light with a large incidence angle is reflected at a position near the opening end portion 350 wherefrom the sensing light is emitted. Moreover, the reflected detection light can be made to strike an inner bottom face of the first concave portion 313 or second concave portion 314 near the opening end portion 350 and head in a direction that is different from the direction of heading toward the detector 303. Therefore, incidence to the detector 303 can be suppressed, enabling further suppression of the detection light of the angle other than the predetermined angle becoming incident to the detector 303.

Furthermore, in the optical scanning device 300 of the third embodiment of the present invention, the depths of the first concave portion 313 and the second concave portion 314 are configured as sizes that are equal to or greater than the length W in the width direction (X-axis direction) of the slit s. This enables the detection light that is diagonally incident to the slit s to be reflected at a deep position, on the inner face of the first concave portion 313 or the second concave portion 314 that is recessed in the direction along the pivoting direction Ry of the reflector 301. As such, the light amount reaching the detector 303 can be suppressed even further. As a result, the detection light of the angle other than the predetermined angle can be suppressed even further from becoming incident to the detector 303. Other effects of the third embodiment of the present invention are similar to the first embodiment of the present invention.

Fourth Embodiment

Figure 10:
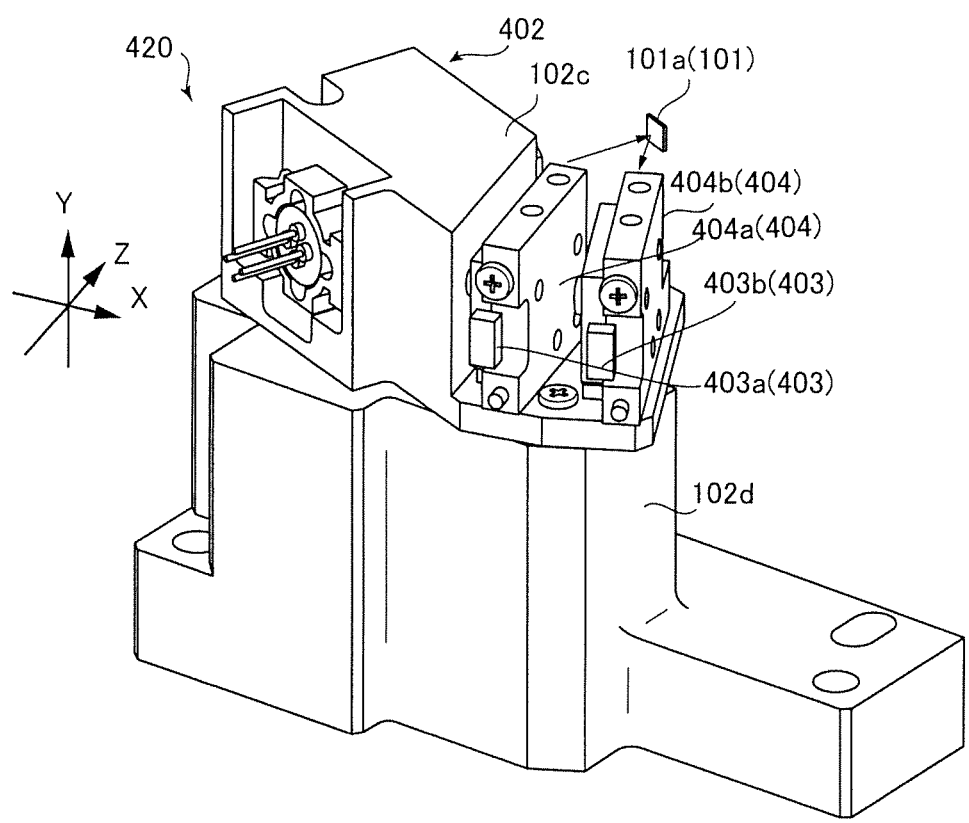
FIG. 10 is a perspective view illustrating a configuration of a pivot-angle detector according to the fourth embodiment of the present invention.
Figure 11:
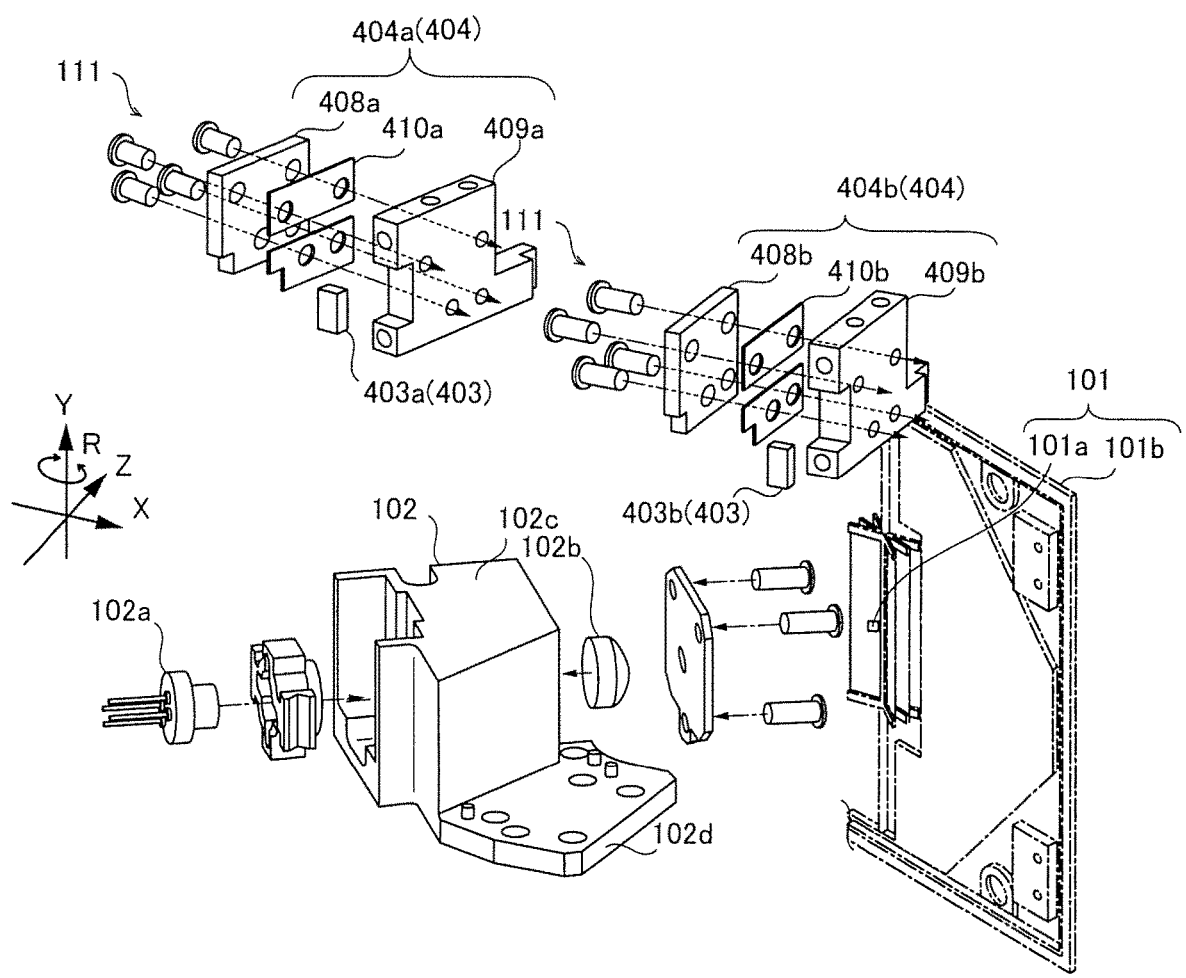
FIG. 11 is an exploded perspective view illustrating the configuration of the pivot-angle detector according to the fourth embodiment of the present invention.

A configuration of a pivot-angle detector 420 of a fourth embodiment of the present invention is described with reference to FIGS. 1, 10, and 11. Unlike the pivot-angle detector 120 of the first embodiment, the pivot-angle detector 420 of the fourth embodiment of the present invention includes a plurality of detectors 403 and light-blocking units 404. Note that in a configuration of an optical scanning device 400 (see FIG. 1), portions identical to the first embodiment are labeled with the same reference signs, description thereof being omitted.

The optical scanning device 400 of the fourth embodiment of the present invention includes the plurality of light-blocking units 404 and the plurality of detectors 403 and is configured to acquire the pivot angle θ from the detection lights acquired by each of the plurality of detectors 403. The fourth embodiment of the present invention includes a first detector 403a, a first light-blocking unit 404a, a second detector 403b, and a second light-blocking unit 404b. In the fourth embodiment of the present invention, the first light-blocking unit 404a and the second light-blocking unit 404b are fixed on the fixing portion 102d of the light-emitter 102 so they each sense different pivot angles θ. By this, the first detector 403a and the second detector 403b respectively detect sensing lights of different pivot angles θ. The pivot angle θ is detected relatively from the pivot angles θ detected with each detector 403. Other configurations of the fourth embodiment of the present invention are similar to the first embodiment of the present invention.

The fourth embodiment of the present invention may provide advantages such as the following.

The optical scanning device 400 of the fourth embodiment of the present invention includes the plurality of light-blocking units 404 and the plurality of detectors 403 and is configured to acquire the pivot angle θ from the detection lights acquired by each of the plurality of detectors 403. By this, a shift in the pivot angle θ can be relatively acquired by detecting a shift in the pivot angle θ based on the detection lights acquired by each of the plurality of detectors 403 and comparing the detected shifts in the pivot angle θ. Other effects of the fourth embodiment of the present invention are similar to the first embodiment of the present invention.

EXAMPLES

Next, tests performed to confirm the effects of one or more embodiments of the present invention are described.

(Measurement of Resolution)

First, the light-blocking unit 104 of the first embodiment is made as example 1. At this time, the length W, in the width direction (X-axis direction) along a pivoting direction (Ry direction) of the reflector 101, of the opening end portion 150 of the slit s is made to be 0.1 mm and the length D, in the direction (Z-axis direction) wherein the optical path extends, of the slit s is made to be 10 mm. Note that the aspect ratio of the slit s in example 1 is 100, which is high.

Meanwhile, as a comparative example 1 for example 1, a light-blocking unit is made having a slit of an aspect ratio of 20, where the length W in the width direction (X-axis direction) of the slit s is 0.1 mm and the length D, in the direction (Z-axis direction) wherein the optical path extends, of the slit s is 2 mm. Note that the aspect ratio of the slit s in comparative example 1 is 20, which is low.

Figure 12:
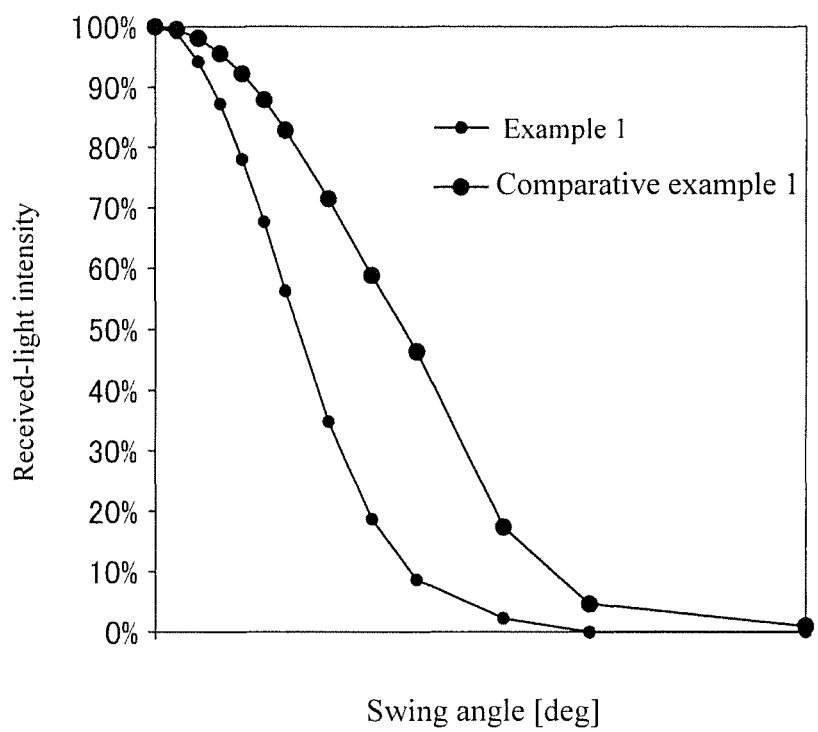
FIG. 12 is a graph illustrating a change in a relationship between swing angle and received-light intensity in a situation where a depth of a slit of a light-blocking unit is changed according to one or more embodiments of the present invention.

Using an optical scanning device that uses each light-blocking unit that is made, a received-light intensity (a numerical value representing an intensity of light that is reflected upon irradiating a laser light to an object) in a situation where the reflector is pivoted from a predetermined angle is measured. Note that a pivot angle in a situation where the predetermined angle is made to be 0 is defined as a swing angle (detection error). FIG. 12 illustrates measurement results.

As illustrated in FIG. 12, change in the received-light intensity in a situation where the swing angle is changed is steep in example 1. However, in comparative example 1, this is less so compared to example 1. From this, it was confirmed that the optical scanning device 100 of the embodiment of the present invention can detect only a detection light having a swing angle of a narrow range such that a pivot-angle resolution is high.

(Measurement Relating to Light-Absorbing Member)

Figure 13:
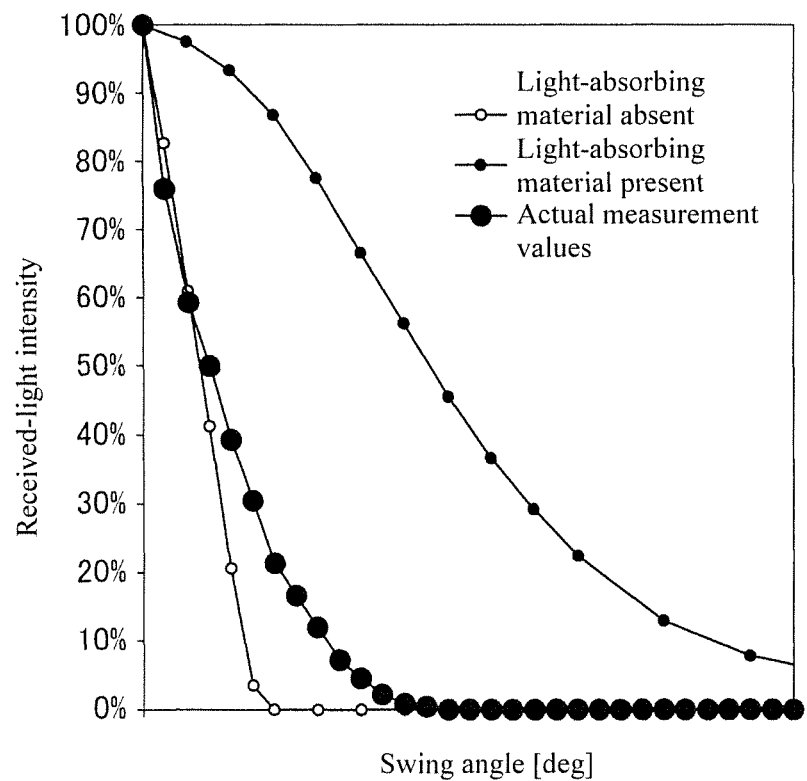
FIG. 13 is a graph illustrating the relationship between swing angle and received-light intensity in a situation where reflection at an inner face of the slit is present and a situation where this is absent according to one or more embodiments of the present invention.

FIG. 13 illustrates a simulation of a situation where, in the optical scanning device 400 of the fourth embodiment of the present invention, the light-absorbing materials (108a, 109a; see FIGS. 6A-6C) are provided on the faces of the first support member 108 and the second support member 109 of the slit s opposing the slit member 110 and a situation where no light-absorbing materials are provided on the faces opposing the slit member 110 and actual measurement values of a situation where the light-absorbing materials are actually provided. As illustrated in FIG. 13, the actual measurement values of the situation where the light-absorbing materials are actually provided results that were close to those of the simulation of the situation where the light-absorbing materials are provided. As a result, it was able to be confirmed that the light-absorbing materials provided on the faces of the first support member 108 and the second support member 109 opposing the slit member 110 can reliably suppress a detection light greatly shifted from the predetermined angle (a detection light with a large swing angle) from being detected.

(Variations)

One or more embodiments of the present invention disclosed herein are examples on all counts and should not be considered to be limiting. The scope of the present invention is indicated not by the above description of one or more embodiments of the present invention but by the claims and includes meanings equivalent to the claims as well as all changes (variations) within this scope.

For example, although an example is illustrated where the first reflective face and the second reflective face are front and rear faces of the reflector of the first embodiment of the present invention, the present invention is not limited thereto. In the present invention, as long as reciprocating pivoting movement can be synchronized, the first reflective face and the second reflective face may be provided independently.

Furthermore, although the light sources used for the first reflective face and the second reflective face in the first embodiment of the present invention are illustrated as being separate, the present invention is not limited thereto. In the present invention, only one light source may be used as the light source used for the first reflective face and the second reflective face in the first embodiment of the present invention. At this time, the reflector may be a half mirror.

Furthermore, although a situation is illustrated where the light-emitter of the first embodiment of the present invention uses a semiconductor laser element, the present invention is not limited thereto. In the present invention, a surface-emitting laser, a light-emitting diode, or the like may be used in the light-emitter. Moreover, although an example is described where a photodiode is used as the detector, an optimal detector may be provided according to the light source that is used as the light-emitter.

Furthermore, although an example is illustrated where the light-blocking unit of the first embodiment of the present invention includes the slit s that is of the rectangular shape when viewed from the Z-axis direction, the present invention is not limited thereto. In the present invention, a slit s that is of a circular shape when viewed from the Z-axis direction may be provided. Note that when a slit s of an aspect ratio of 40—where a length, in the X-axis direction of the reflector, of the opening end portion is 0.5 mm and a length in the Z-axis direction (diameter) is 20 mm was actually made, the received-light intensity exhibited a value identical to example 1.

Although the second embodiment of the present invention illustrates an example where two layers of slit members are provided, the present invention is not limited thereto. The present invention may stack three or more slit members.

Although the third embodiment of the present invention illustrates an example where the first concave portion and the second concave portion are U-shaped in the cross section orthogonal to the Z-axis direction, the present invention is not limited thereto. In the present invention, the first concave portion and the second concave portion may be of a semi-circle shape in a cross section orthogonal to the pivoting direction of the reflector.

Although the fourth embodiment of the present invention illustrates an example where two light-blocking units and two detectors are provided, the present invention is not limited thereto. In the present invention, three or more light-blocking units and three or more detectors may be provided. In this situation, the user appropriately adjusts the angles whereat the light-blocking units are disposed.

The user may combine the first to fourth embodiments of the present invention as appropriate. For example, a resolution of detecting the pivot angle may be improved by combining the second, third, and fourth embodiments of the present invention. Note that the pivot-angle detector may be provided to an optical scanning device, a sensing, Light Detection and Ranging (LIDAR), or the like.

Although an example is illustrated where the pivot-angle detectors of the first to fourth embodiments of the present invention detect the pivot angle of the horizontal scanning mirror, the present invention is not limited thereto. In the present invention, the pivot-angle detectors may be configured to detect the pivot angle of the vertical scanning mirror instead of the horizontal scanning mirror. Moreover, the optical scanning devices may be provided with both a pivot-angle detector that detects the pivot angle of the horizontal scanning mirror and a pivot-angle detector that detects the pivot angle of the vertical scanning mirror.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

101 Reflector
101c First reflective face
101d Second reflective face
102 Light-emitter
103, 203, 303, 403a, 403b Detector
104, 204, 304, 404a, 404b Light-blocking unit
108, 208, 308, 408a, 408b First support member
109, 209, 309, 409a, 409b Second support member
110, 210, 410a, 410b Slit member
212 Partitioning member
313 First concave portion
314 Second concave portion
s Slit
θ Pivot angle

What is claimed is:

1. An optical scanning device, comprising:
a reflector that is pivotable;
a light-emitter that emits a detection light toward the reflector;
a detector that receives the detection light reflected at the reflector; and
a light-blocking unit that comprises a slit wherethrough the detection light passes, wherein the light-blocking unit is disposed on an optical path whereby the detection light reflected from the reflector advances to the detector, wherein the slit has an aspect ratio where a length of the slit in a direction in which the optical path extends relative to a length of the slit in a width direction is equal to or greater than a predetermined value, wherein the width direction is along a pivoting direction of the reflector, of an opening end portion of the slit, wherein the detector is configured to detect a pivot angle of the reflector by receiving the detection light that passes through the slit, wherein the light-blocking unit comprises a first support member, a second support member, and a slit member that comprises the slit, wherein the slit member is interposed by the first support member and the second support member, wherein the slit is formed by a portion surrounded by the first support member, the second support member, and the slit member, wherein the first support member and the second support member respectively include a first concave portion and a second concave portion recessed in a direction along the pivoting direction of the reflector, and wherein the first concave portion and the second concave portion are disposed in portions other than the opening end portion, whereto the detection light is made incident and wherefrom the detection light is emitted.

2. The optical scanning device according to claim 1, wherein the aspect ratio of the slit of the light-blocking unit is equal to or greater than 20.

3. The optical scanning device according to claim 1, wherein the reflector comprises a first reflective face that is used to scan light and a second reflective face disposed on an opposite side of the first reflective face and that is used to detect the pivot angle, and wherein the detector detects the pivot angle of the first reflective face by receiving the detection light reflected at the second reflective face.

4. The optical scanning device according to claim 1, wherein the first support member, the second support member, and the slit member are configured by plate-shaped members.

5. The optical scanning device according to claim 1, wherein the slit is rectangular when viewed from the direction where the optical path extends.

6. The optical scanning device according to claim 1, wherein depths of the first concave portion and the second concave portion are of a size that is equal to or greater than the length in the width direction of the slit.

7. The optical scanning device according to claim 1, wherein of the first support member and the second support member, at least a face opposing the slit member comprises a light-absorbing material.

8. The optical scanning device according to claim 1, wherein a plurality of slit members is stacked in a direction of being interposed by the first support member and the second support member, and wherein partitioning members are provided between slit member and slit member.

9. The optical scanning device according to claim 1, wherein the reflector performs reciprocating pivoting movement, and wherein the detector is configured to acquire the pivot angle based on a time from when the detection light reflected by the reflector is received to when the detection light reflected by the reflector is again received.

10. The optical scanning device according to claim 3, wherein an area of the second reflective face is smaller than an area of the first reflective face.

11. The optical scanning device according to claim 10, wherein a rear face of the first reflective face, except for the second reflective face, is applied with a light-reflection suppression treatment.

12. The optical scanning device according to claim 1, further comprising:
a plurality of light-blocking units and a plurality of detectors,
wherein the pivot angle is acquired from the detection lights acquired by each of the plurality of detectors.

13. The optical scanning device according to claim 2, wherein the reflector comprises a first reflective face that is used to scan light and a second reflective face disposed on an opposite side of the first reflective face and that is used to detect the pivot angle, and wherein the detector detects the pivot angle of the first reflective face by receiving the detection light reflected at the second reflective face.

14. The optical scanning device according to claim 4, wherein the slit is rectangular when viewed from the direction where the optical path extends.

15. An optical scanning device, comprising:
a reflector that is pivotable;
a light-emitter that emits a detection light toward the reflector;
a detector that receives the detection light reflected at the reflector; and
a light-blocking unit that comprises a plurality of slits wherethrough the detection light passes, wherein the light-blocking unit is disposed on an optical path whereby the detection light reflected from the reflector advances to the detector, wherein each of the plurality of slits has an aspect ratio where a length in a direction in which the optical path extends relative to a length in a width direction is equal to or greater than a predetermined value, wherein the width direction is along a pivoting direction of the reflector, of an opening end portion of any one of the plurality of slits, wherein the detector is configured to detect a pivot angle of the reflector by receiving the detection light that passes through the plurality of slits, wherein the light-blocking unit comprises:
a first support member;
a second support member;
a plurality pairs of slit members; and
one or more of partitioning members, wherein the plurality pairs of slit members and the partitioning members are interposed by the first support member and the second support member, wherein the plurality pairs of slit members and the partitioning members are stacked in a direction of being interposed by the first support member and the second support member, and wherein each of the plurality of slits is formed by a portion surrounded by:
two adjacent members of the first support member, the second support member, and the partitioning members; and one of the plurality pairs of slit members that is interposed by the two adjacent members.

* * * * *